US008539068B2

(12) United States Patent
Sureshehandra et al.

(10) Patent No.: US 8,539,068 B2
(45) Date of Patent: Sep. 17, 2013

(54) METHODS AND SYSTEMS FOR PROVIDING CUSTOMIZED DOMAIN MESSAGES

(75) Inventors: Jayesh Sureshehandra, San Francisco, CA (US); Tripti Sheth, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 192 days.

(21) Appl. No.: 12/974,280

(22) Filed: Dec. 21, 2010

(65) Prior Publication Data

US 2011/0302256 A1 Dec. 8, 2011

Related U.S. Application Data

(60) Provisional application No. 61/352,292, filed on Jun. 7, 2010.

(51) Int. Cl.
*G06F 15/16* (2006.01)

(52) U.S. Cl.
USPC ............ 709/224; 709/204; 709/206; 709/231

(58) Field of Classification Search
USPC .................. 709/220, 224, 227, 228, 321, 204
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,673,254 A * | 9/1997 | Crayford | 370/231 |
| 5,715,450 A | 2/1998 | Ambrose et al. | |
| 5,761,419 A | 6/1998 | Schwartz et al. | |
| 5,761,505 A * | 6/1998 | Golson et al. | 713/100 |
| 5,819,038 A | 10/1998 | Carleton et al. | |
| 5,821,937 A | 10/1998 | Tonelli et al. | |
| 5,831,610 A | 11/1998 | Tonelli et al. | |
| 5,859,837 A * | 1/1999 | Crayford | 370/230 |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |

(Continued)

*Primary Examiner* — Khanh Dinh
(74) *Attorney, Agent, or Firm* — Ingrassia Fisher & Lorenz, P.C.

(57) ABSTRACT

Methods and apparatus are provided for providing customized domain messages. A customized message for one of a plurality of domains is received at one of a plurality of servers of a content delivery network. A request is received from a user device for content for the one of the plurality of domains at the one of the plurality of servers. The customized message is provided by the one of the plurality of servers to the user device in response to the request when the one of the plurality of domains is unavailable.

14 Claims, 6 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,188,343 B2 * | 3/2007 | Sanchez et al. ............... 718/100 |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,266,269 B2 * | 9/2012 | Short et al. ................... 709/223 |
| 8,275,836 B2 | 9/2012 | Beaven et al. |
| 8,316,457 B1 * | 11/2012 | Paczkowski et al. ........... 726/27 |
| 8,392,581 B2 * | 3/2013 | Ait-Ameur et al. ........... 709/227 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0098375 A1 * | 5/2004 | DeCarlo, III ..................... 707/3 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210909 A1 | 10/2004 | Dominguez, Jr. et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0029093 A1 * | 2/2006 | Van Rossum ................. 370/432 |
| 2006/0206834 A1 | 9/2006 | Fisher et al. |
| 2007/0233851 A1 * | 10/2007 | Ma ................................ 709/224 |

* cited by examiner

METHODS AND SYSTEMS FOR PROVIDING CUSTOMIZED DOMAIN MESSAGES

PRIORITY CLAIMS

This application claims priority of U.S. Application No. 61/352,292, filed Jun. 7, 2010, the entirety of which is incorporated herein by reference.

TECHNICAL FIELD

The following discussion relates to data processing systems and processes, and more particularly relates to systems and processes for providing customized error messages for domains.

BACKGROUND

Application service providers and content delivery networks often serve a vast number of different domains for a large number of different clients. Each particular domain represents a virtual location by which a client may offer content for various users. For example, many clients of application service providers and content delivery networks offer specific websites at client-specific domain names on the Internet. When an Internet user makes a request for content from a particular website or domain of a particular client, the request is handled by the content delivery network and the application service provider that are responsible for hosting the domain for the particular client. The content delivery network obtains the content for the particular domain from the application service provider responsible for hosting content for that particular domain, and provides the content for the particular domain to the Internet user on the user's computer or other user device.

The application service provider and the content delivery network typically provide such services to a large number of clients, with each of the clients owning one or more domains. Such an environment can provide effective service with a high level of efficiency. However, in the event that the content for one of the domains becomes unavailable (for example, if a platform of the application service provider becomes unavailable), it may be desirable to provide an applicable error message to users of the domain as to the unavailability of the content for the domain. However, with content delivery networks and application service providers hosting a large number of domains for a large number of clients, it may be difficult to convey an effective error message to the user of a particular domain. Furthermore, other desirable features and characteristics will become apparent from the subsequent detailed description of the invention and the appended claims, taken in conjunction with the accompanying drawings and this background.

DESCRIPTION OF THE DRAWING FIGURES

Exemplary embodiments will hereinafter be described in conjunction with the following drawing figures, wherein like numerals denote like elements, and FIG. 1 is a block diagram of an exemplary multi-tenant domain management system;

DETAILED DESCRIPTION

The following detailed description is merely exemplary in nature and is not intended to limit the disclosure or uses thereof. Furthermore, there is no intention to be bound by any theory presented in the preceding background or the following detailed description.

According to various exemplary embodiments, systems and methods are provided for providing customized error messages distributed through a content delivery network for domains when content associated with a particular domain is unavailable. Specifically, a customized error message for each domain is created in advance and provided to the content delivery network for storage on multiple servers through the content delivery network. Subsequently, when content for the domain is unavailable (for example, if a server for an application system servicing the domain is down), the content delivery network provides the customized error for users of the domain.

Figure 1:
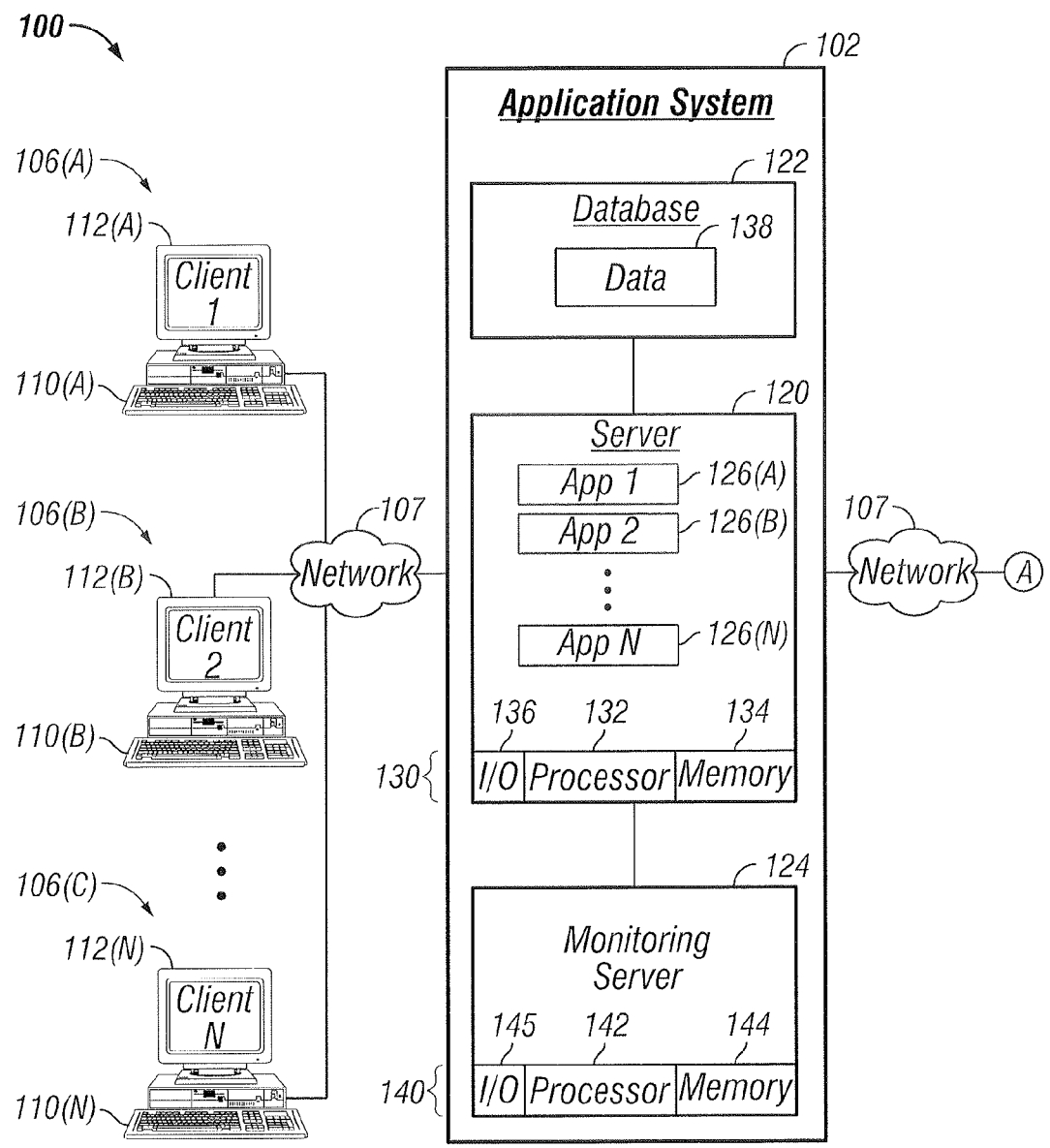
Figure 1:
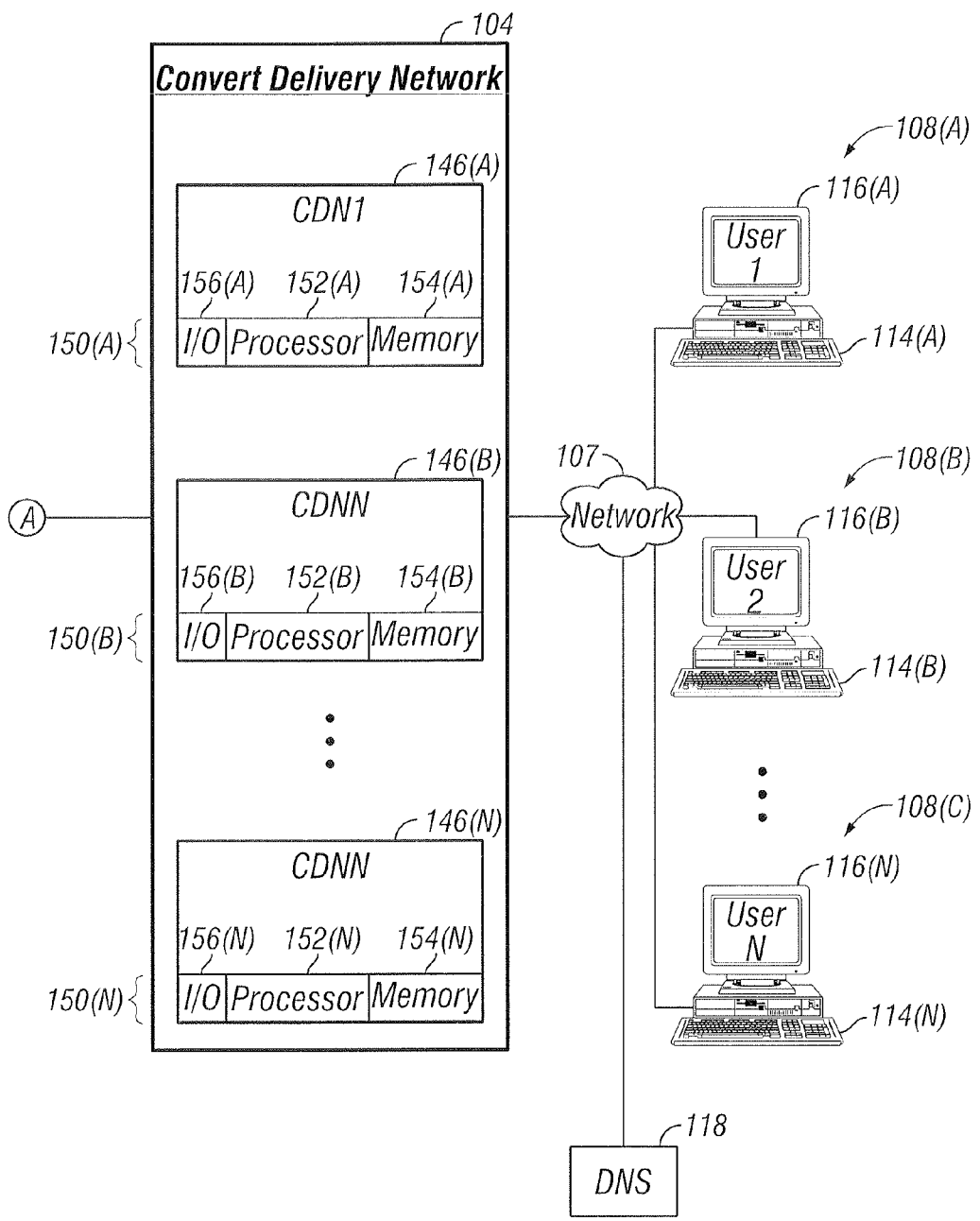

Turning now to FIG. 1, an exemplary domain management system 100 is provided. The domain management system 100 includes an application system 102 and a content delivery network 104. The application system 102 and the content delivery network 104 are coupled to one another, and to various clients 106 and users 108, via one or more networks 107, such as the Internet. Specifically, the application system 102 and the content delivery network 104 provide content (for example, dynamic content and/or the like for Internet website pages) for any number of different domains.

In the depicted embodiment, the clients 106 provide various content and information (including a customized error message) for their respective domains via client devices 110 (for example, client computers) and/or programs 112 (for example, computer programs) to the application system 102 for storage and processing. Subsequently, when users 108 seek to access content for the domain of a particular client 106 via user devices 114 (for example, user computers) and/or programs 116 (for example, computer programs), the content delivery network 104 makes appropriate inquiries to the application system 102 regarding content for the domain, receives appropriate content and/or notifications from the application system 102, and provides appropriate content or an appropriate customized error message (if the content is unavailable) pertaining to the domain for the user 108. Also in the depicted embodiment, a domain name system 118 is also coupled to the network 107, and facilitates requests by the users 108 to the content delivery network 104 for accessing specific domains, for example by matching up Internet Protocol (IP) addresses with corresponding domain names for the applicable domains.

As depicted in FIG. 1, there may be any number of clients 106 (depicted as clients 106(A), 106(B), . . . 106(N)) having any number of respective client devices 110 (depicted as client devices 110(A), 110(B), . . . 110(N)) and/or programs 112 (depicted as programs 112(A), 112(B), . . . 112(N)). Similarly, also as depicted in FIG. 1, there may be any number of users 108 (depicted as users 108(A), 108(B), . . . 108(N)) having any number of respective user devices 114 (depicted as user devices 114(A), 114(B), . . . 114(N)) and/or programs 116 (depicted as programs 116(A), 116(B), . . . 116(N)).

The application system 102 services the domains (for example, the websites thereof) for the clients 106, in accordance with the steps of one or more of the processes described further below in connection with FIGS. 2-5. The application system 102 receives, from each client 106, one or more packages or files with content for each of the client 106's domains along with a customized error message for each domain. The customized error message is customized in a manner of the client 106's choosing. For example, the customized error message may include the name of the client 106, the name of the client 106's domain, one or more images of the client 106's choosing, contact information for the client 106, and/or a message indicating that the domain is currently unavailable, among other possible information. The application system 102 saves the content and the customized error message for each client 106. The application system 102 coordinates the providing of the content for the domain of the client 106 via the content delivery network 104 when such content is requested by a user 108 and the content is available. The application system 102 also coordinates the providing of the customized error message for the domain of the client 106 via the content delivery network 104 when the content is requested by a user 108 and the content is unavailable.

The application system 102 preferably comprises a multi-tenant application system 102, with each client 106 representing a tenant of the multi-tenant application system 102. The multi-tenant application system 102 is coupled to the client devices 110 and the content delivery network 104 via the one or more networks 107. As depicted in FIG. 1, the multi-tenant application system 102 suitably includes a server 120, a database 122, and a monitoring server (or proxy) 124.

The server 120 of the application system 102 dynamically creates any number of virtual applications 126 (depicted as applications 126(A), 126(B), . . . 126(N)) based upon data 138 from a common database 122 that is shared between multiple tenants. Data and services generated by the virtual applications 126 are provided via network 107 to any number of client devices 110, as desired. Each virtual application 126 is suitably generated at run-time using a common platform that securely provides access to data 138 in database 122 for each of the various tenants subscribing to application system 102. In the depicted embodiment, each of the virtual applications 126 facilitates coordination of the providing of the content and customized error messages for a particular domain for a corresponding client 106.

A "tenant" generally refers to a group of users that shares access to common data within database 122. Tenants may represent customers, customer departments, business or legal organizations, and/or any other entities that maintain data for particular sets of users within application system 102. Specifically, each tenant preferably comprises one or more of the above-referenced clients 106. Although multiple tenants may share access to a common server 120 and database 122, the particular data and services provided from server 120 to each tenant can be securely isolated from those provided to other tenants, as described more fully below. The multi-tenant architecture therefore allows different sets of users to share functionality without necessarily sharing each other's data 138.

Database 122 is coupled to the server 120, and may comprise any sort of repository or other data storage system capable of storing and managing data 138 associated with any number of tenants. Database 122 may be implemented using any type of conventional database server hardware. In various embodiments, database 122 shares processing hardware 130 with server 120. In other embodiments, database 122 is implemented using separate physical and/or virtual database server hardware that communicates with server 120 to perform the various functions described herein. Preferably, the content and customized error messages for each of the domains of each of the clients 106 are stored as data 138 in the database 122.

The data 138 may be organized and formatted in any manner to support a multi-tenant application platform. In various embodiments, data 138 is suitably organized into a relatively small number of large data tables to maintain a semi-amorphous "heap"-type format. Data 138 can then be organized as needed for a particular virtual application 126. In certain embodiments, conventional data relationships are established using any number of pivot tables that establish indexing, uniqueness, relationships between entities, and/or other aspects of conventional database organization as desired. In addition, in certain embodiments, further data manipulation and report formatting is generally performed at run-time using a variety of meta-data constructs.

Server 120 is implemented using one or more actual and/or virtual computing systems that collectively provide a dynamic application platform for generating virtual applications 126. Server 120 operates with any sort of conventional computing hardware 130, such as any processor 132, memory 134, input/output features 136 and the like. Processor 132 may be implemented using one or more of microprocessors, microcontrollers, processing cores and/or other computing resources spread across any number of distributed or integrated systems, including any number of "cloud based" or other virtual systems. Memory 134 represents any non-transitory short or long term storage capable of storing programming instructions for execution on processor 132, including any sort of random access memory (RAM), read only memory (ROM), flash memory, magnetic or optical mass storage, and/or the like. Input/output features 136 represent conventional interfaces to networks (for example, to network 107, or any other local area, wide area or other network), mass storage, display devices, data entry devices and/or the like. In a typical embodiment, application platform accesses processing resources, communications interfaces and other features of hardware 130 using any sort of conventional or proprietary operating system. As noted above, server 120 may be implemented using a cluster of actual and/or virtual servers operating in conjunction with each other, typically in association with conventional network communications, cluster management, load balancing and other features as appropriate.

The monitoring server 124 is coupled to the server 120 and to the content delivery network 104. The monitoring server 124 provides a notification to the content delivery network 104 when the content for a particular domain is unavailable. Preferably, the monitoring server 124 determines when the server 120 of the application system 102 is unavailable. For example, the server 120 may be unavailable when the server 120 is undergoing maintenance or is otherwise offline. When the server 120 is unavailable (or when content for the domain is otherwise unavailable), the monitoring server 124 provides a notification to the content delivery network 104 along the network 107, so that the customized error message can be provided for the user 108 who has requested content from the domain.

The monitoring server 124 operates with any sort of conventional computing hardware 140, such as any processor 142, memory 144, input/output features 145 and the like. Processor 142 may be implemented using one or more of microprocessors, microcontrollers, processing cores and/or other computing resources spread across any number of distributed or integrated systems, including any number of "cloud based" or other virtual systems. Memory 144 represents any non-transitory short or long term storage capable of storing programming instructions for execution on processor 142, including any sort of random access memory (RAM), read only memory (ROM), flash memory, magnetic or optical mass storage, and/or the like. Input/output features 145 represent conventional interfaces to networks (for example, to network 107, or any other local area, wide area or other network), mass storage, display devices, data entry devices and/or the like. In a typical embodiment, application platform accesses processing resources, communications interfaces and other features of hardware 140 using any sort of conventional or proprietary operating system. The monitoring server 124 may be implemented using a cluster of actual and/or virtual servers operating in conjunction with each other, typically in association with conventional network communications, cluster management, load balancing and other features as appropriate In one embodiment, the monitoring server 124 comprises an alternate cache server.

The content delivery network 104 also services the domains (for example, the websites thereof) for the clients 106, in accordance with the steps of one or more of the processes described further below in connection with FIGS. 2-5. The content delivery network 104 receives requests from various users 108 (preferably, from user devices 114 thereof) to access content from particular domains belonging to or more clients 106. The content delivery network 104 fulfills such requests by obtaining content pertaining to the domain from the application system 102 and then providing the content to the user 108, provided that the content for the domain is available. If the content is unavailable, the content delivery network 104 instead receives a notification from the application system 102 as to the unavailability of the content, and then provides the customized error message for the domain to the user 108.

The content delivery network 104 preferably receives the customized error message for the domain, along with any instructions pertaining thereto, in advance of the user 108's request. Accordingly, the content delivery network 104 can quickly provide the customized error message for the domain to the user 108 following the user 108's request for content for the domain when the content for the domain is unavailable, such as when the server 120 of the application system 102 is undergoing maintenance, offline, or otherwise unavailable.

The content delivery network 104 includes a plurality of servers 146. Any number of servers 146 (denoted in FIG. 1 as servers 146(A), 146(B), . . . 146(N)) may be utilized. The plurality of servers 146 preferably reside in different geographic locations to facilitate interaction with various users 108 residing in different geographic locations and/or using different networks.

Each server 146 is configured to receive requests from various users 108 seeking content for various domains. When a server 146 receives such a request for content for a particular domain, the server 146 sends an inquiry or request to the application system 102 for the content for the domain to which the user 108 request pertains. If the content for the domain is available (for example, if the server 120 of the application system 102 is available), the applicable server 146 of the content delivery network 104 receives the content from the application system 102, and provides the content along the network 107 to the user device 114 for the user 108 that made the request. If the content for the domain is unavailable (for example, if the server 120 of the application system 102 is unavailable), the applicable server 146 of the content delivery network 104 receives a notification from the monitoring server 124 of the application system 102 that the content is unavailable, and the applicable server 146 of the content delivery network 104 then provides the customized error message for the domain to the user 108 who made the request (preferably via the network 107 to the user device 114 corresponding to the user 108 who made the request).

As mentioned above, in the depicted embodiment, a domain name system 118 is also coupled to the network 107, and facilitates requests by the users 108 to the content delivery network 104 for accessing specific domains, for example by matching up Internet Protocol (IP) addresses with corresponding domain names for the applicable domains. In addition, in one embodiment, each server 146 operates with any sort of conventional computing hardware 150, such as any processor 152, memory 154, input/output features 156 and the like. Processor 152 may be implemented using one or more of microprocessors, microcontrollers, processing cores and/or other computing resources spread across any number of distributed or integrated systems, including any number of "cloud based" or other virtual systems. Memory 154 represents any non-transitory short or long term storage capable of storing programming instructions for execution on processor 152, including any sort of random access memory (RAM), read only memory (ROM), flash memory, magnetic or optical mass storage, and/or the like. Input/output features 156 represent conventional interfaces to networks (for example, to network 107, or any other local area, wide area or other network), mass storage, display devices, data entry devices and/or the like. In a typical embodiment, application platform accesses processing resources, communications interfaces and other features of hardware 150 using any sort of conventional or proprietary operating system. Each server 146 may be implemented using a cluster of actual and/or virtual servers operating in conjunction with each other, typically in association with conventional network communications, cluster management, load balancing and other features as appropriate.

Figure 2:
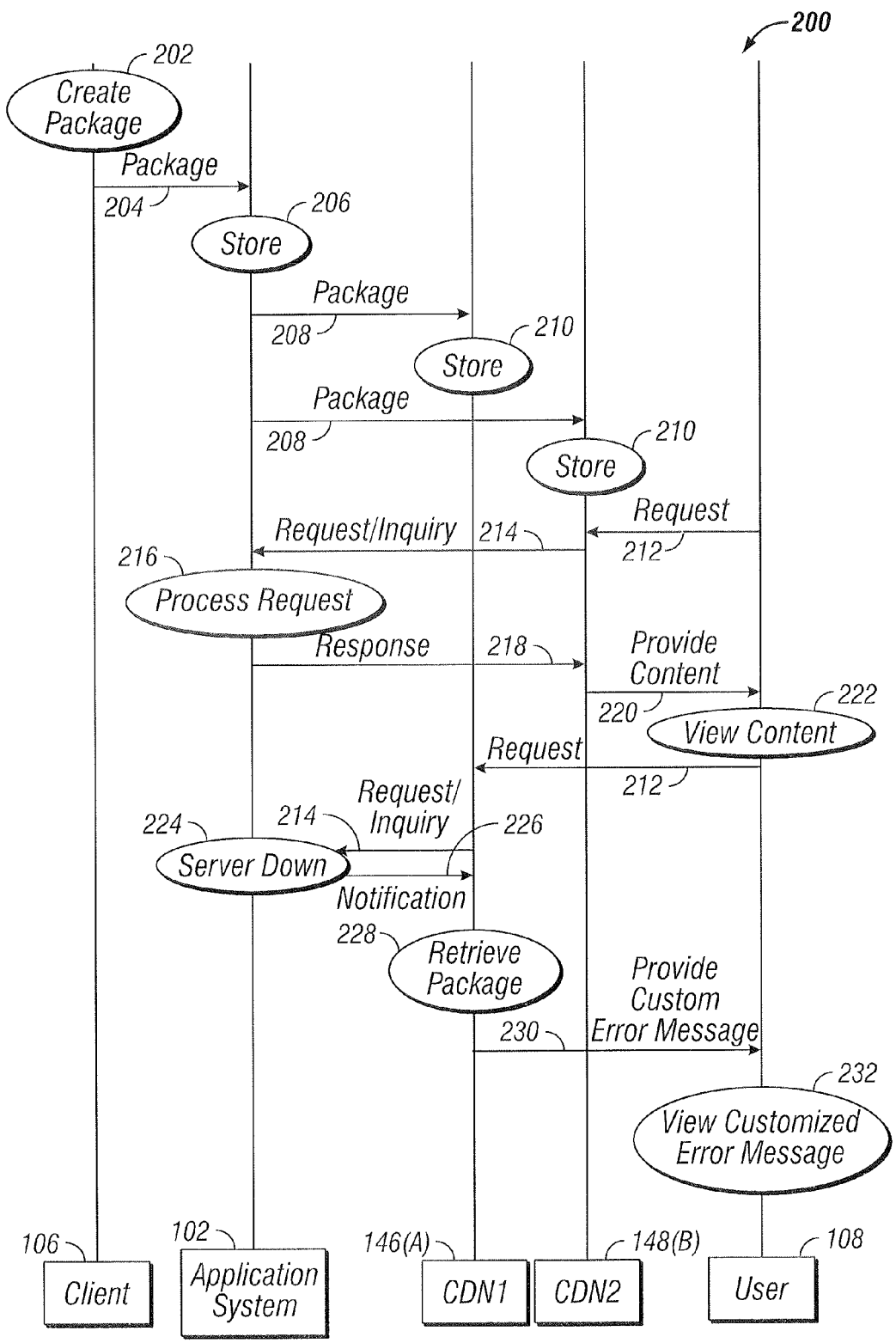
FIG. 2 is a flow diagram of an exemplary process for providing customized domain error messages, and that can be implemented using the multi-tenant domain management system of FIG. 1.

FIG. 2 is a flow diagram of an exemplary process 200 for providing customized domain error messages. The process 220 can be implemented using the multi-tenant domain management system 100 of FIG. 1.

As depicted in FIG. 2, the process 220 includes the step of creating a package (step 202). The package preferably comprises a data message and/or file, and is created by one of the clients 106 of FIG. 1 on a respective one of the client devices 110 of FIG. 1. The package includes content for a domain (for example, for a customized a website) of the client 106 as well as a customized error message for the domain for display when the content is unavailable.

The package is transmitted by the client 106 to the application system 102 of FIG. 1 along the network 107 of FIG. 1, and is received by the server 120 of the application system 102 (step 204). The server 122 of the application system 102 stores the package in the database 122 (step 206). In addition, in certain embodiments, the server 120 of the application system 102 may check the format of the package. The server 120 of the application system 102 transmits the package to multiple content delivery network servers 146 of FIG. 1 (step 208), which then each store the package in respective memory 154 thereof (step 210). Steps 202-210 are each preferably performed in advance of any user request to access content for the domain.

Subsequently, one of the users 108 of FIG. 1 makes a request to access the content for the domain (step 212). During step 212, the request is preferably made by one of the users 108 of FIG. 1 via a user device 114 of FIG. 1 along the network 107 to the content delivery network 104. The content delivery network 104 (preferably, one of the servers 146 thereof) then, in response to the user 108 request, submits an inquiry or further request, accordingly, to the application system 102 (step 214).

The application system 102 then processes this inquiry or request, provided that the content for the domain is available (step 216). Specifically, if the application system server 120 is available (and, therefore, the content for the domain is available), the application system server 120 provides a response to the requesting content delivery network server 146 that includes the requested content for the domain (step 218). The content delivery network server 146 then provides the content for the user 108, preferably to a user device 114 belonging to the user 108 (step 220). The user 108 may then view or access the content for the domain on the user device 114 (step 222).

Conversely, if a determination is made that the application system server 120 is unavailable (step 224) (and, therefore, the content for the domain is unavailable), the monitoring server 124 of FIG. 1 provides a notification to the requesting content delivery network server 146 that the content for the domain is unavailable (strep 226). Alternatively, in certain embodiments, the content delivery network server 146 may determine that the application system server 120 is unavailable if the content delivery network server 146 does not receive a response from the application system server 120 for the requested content within a predetermined amount of time (for example, a few seconds). In any case, after the determination is made that the application server 120 is unavailable, the content delivery network server 146 then retrieves the package from its memory (step 228), and provides the customized error message for the domain for example, a custom error web page stating that the particular domain is unavailable) for the user 108, preferably to a user device 114 belonging to the user 108 (step 230). The user 108 may then view or access the customized error message on the user device 114 (step 232).

While two content delivery network servers 146(A) and 148(B) are denoted in FIG. 2 with respect to the user requests 108 and the corresponding responses, it will be appreciated that the number of content delivery network servers 146 utilized in connection with the user 108 requests for any particular domain may vary. In addition, generally speaking, the various functions and features of process 200 may be carried out with any sort of hardware, software and/or firmware logic that is stored and/or executed on any platform. Some or all of process 200 may be carried out, for example, by logic executing within application system 102 in FIG. 1. For example, various functions shown in FIG. 2 may be implemented using software or firmware logic that is stored in memory 134, 144, and/or 154 and executed by processor 132, 142, and/or 152 as part of an application platform. The particular hardware, software and/or firmware logic that implements any of the various functions shown in FIG. 2, however, may vary from context to context, implementation to implementation, and embodiment to embodiment in accordance with the various features, structures and environments set forth herein. The particular means used to implement each of the various functions shown in FIG. 2, then, could be any sort of processing structures that are capable of executing hardware, software and/or firmware logic in any format. In addition, in certain embodiments, certain steps of the process 200 may vary, and/or may be performed simultaneously or in a different order, than depicted in FIG. 2 and/or described above in connection therewith.

Figure 3:
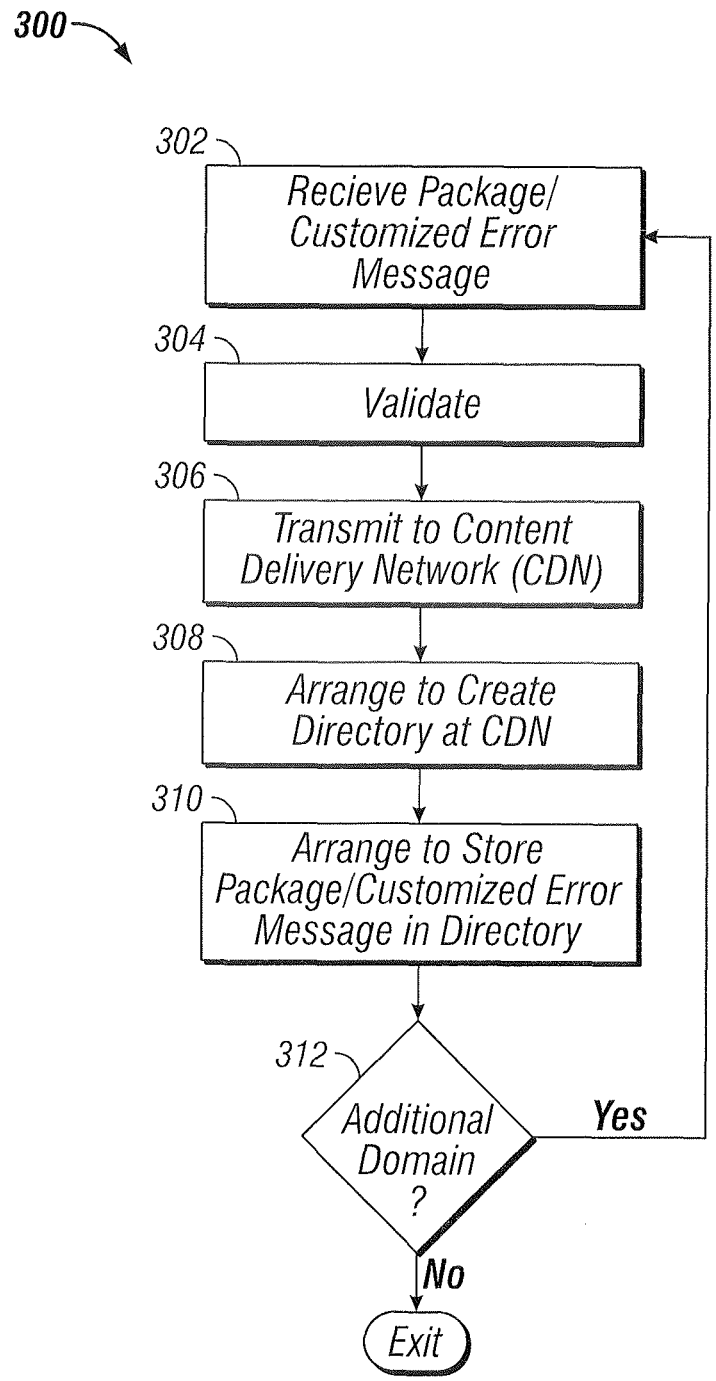
FIG. 3 is a flowchart of another exemplary process for providing customized domain error messages, and that can be implemented using the multi-tenant domain management system of FIG. 1.

FIG. 3 is a flowchart of another exemplary process 300 for providing customized domain error messages. The process 300 can be implemented using the multi-tenant domain management system 100 of FIG. 1.

As depicted in FIG. 3, the process 300 includes the step of receiving a package (step 302). The package includes a data message and/or file (such as a zip file). The package includes a customized error message for a domain (for example, a website) of one of the clients 106 of FIG. 1. The package preferably also includes content for a customized website for the domain. The package is preferably received by the server 120 of the application system 102 of FIG. 1 from the client 106.

In certain embodiments, the package is validated (step 304) (preferably by the application system server 120 of FIG. 1). Regardless, the package (or, at least the file including the customized error message thereof) is transmitted by the application system 102 via the network 107 of FIG. 1 to the content delivery network 104 of FIG. 1 (step 306). Preferably, the server 120 of the application system 102 transmits the package to multiple servers 146 of the content delivery network 104 via a file transfer protocol (FTP). In other embodiments, the transfer may be performed using protocols other than FTP.

In addition, the application system server 120 preferably arranges for the creation of a directory at each of the multiple servers 146 of the content delivery network 104 (step 308) for the particular domain, and arranges to have the package (or the file containing the customized error message) stored in each of the directories (step 310). Also in certain embodiments, the process only hits one endpoint in the content delivery network 104, and then the content delivery network 104 propogates the change (e.g., the customized error message) across all of its servers 146. In addition, in certain embodiments, if a particular client wishes to provide the same error message for multiple domains of the client, the content delivery network 104 may upload the customized error message once but point the various directories for the different domains of that client to the same content.

As referenced throughout this application, each "directory" preferable comprises actual domain being mapped. In one embodiment, error messages may also be customized based on a top level path for each domain. For example, a particular client may have two different websites (for example, foo.force.com/site1 and foo.force.com/site2), and different customized error messages may be generated and uploaded for each such website. In one such embodiment, such different customized error messages for the different websites may be uploaded by first creating a foo.force.com directory. Then, inside the foo.force.com directory, an additional site 1 directory may be created that has one error message for one of the client's websites, an another additional site 2 directory may also be created that contains a different error message for another of the client's websites, and so on.

Steps 302-310 repeat if there is a determination that there are any additional domains to be processed (step 312). Accordingly, the appropriate customized error messages are processed in this manner for each of the domains.

Generally speaking, the various functions and features of process 300 may be carried out with any sort of hardware, software and/or firmware logic that is stored and/or executed on any platform. Some or all of process 300 may be carried out, for example, by logic executing within application system 102 in FIG. 1. For example, various functions shown in FIG. 3 may be implemented using software or firmware logic that is stored in memory 134, 144, and/or 154 and executed by processor 132, 142, and/or 152 as part of an application platform. The particular hardware, software and/or firmware logic that implements any of the various functions shown in FIG. 3, however, may vary from context to context, implementation to implementation, and embodiment to embodiment in accordance with the various features, structures and environments set forth herein. The particular means used to implement each of the various functions shown in FIG. 3, then, could be any sort of processing structures that are capable of executing hardware, software and/or firmware logic in any format. In addition, in certain embodiments, certain steps of the process 300 may vary, and/or may be performed simultaneously or in a different order, than depicted in FIG. 3 and/or described above in connection therewith.

Figure 4:
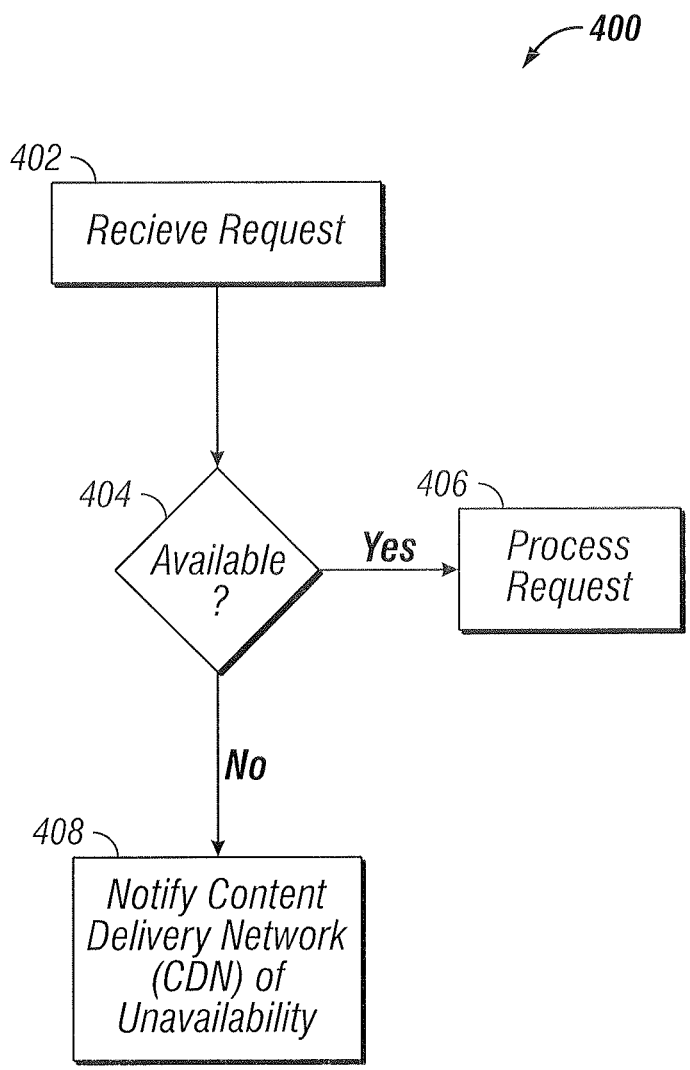
FIG. 4 is a flowchart of another exemplary process for providing customized domain error messages, and that can be implemented using the multi-tenant domain management system of FIG. 1.

FIG. 4 is a flowchart of another exemplary process 400 for providing customized domain error messages. The process 400 can be implemented using the multi-tenant domain management system 100 of FIG. 1.

As depicted in FIG. 4, the process 400 includes the step of receiving a request (step 402). The request pertains to a desire to provide content pertaining to a domain (for example, an Internet website) of a client 106 of FIG. 1 to a user 108 of FIG. 1. The request is received by the application system 102 of FIG. 1 from one of the servers 146 of the content delivery network 104 of FIG. 1 via the network 107 of FIG. 1. The request pertains to one of a plurality of domains hosted by the content delivery network 104.

A determination is then made as to whether the content for the domain is available (step 404). This determination is preferably made by the monitoring server 124 of the application system 102. In one embodiment, if the server 120 of the application system 102 is available, then the monitoring server 124 determines that the content for the domain is available. Conversely, if the server 120 is undergoing maintenance, is offline, or is otherwise unavailable, then the monitoring server 124 determines that the content for the domain is unavailable. Alternatively, in certain embodiments, the content delivery network server 146 may determine that the application system server 120 is unavailable if the content delivery network server 146 does not receive a response from the application system server 120 for the requested content within a predetermined amount of time (for example, a few seconds).

If it is determined in step 404 that the content is available, then the request is processed (step 406). Specifically, the server 120 of the application system 102 processes the request by providing applicable content pertaining to the domain along the network 107 to the content delivery network 104, so that the content delivery network 104 may then provide the desired content to the user 108.

Conversely, if it is determined in step 404 that the content is unavailable, then a notification is provided as to the unavailability of the content (step 408). Specifically, the monitoring server 124 provides a notification along the network 107 to the content delivery network 104 indicating that the content for the domain is unavailable.

Generally speaking, the various functions and features of process 400 may be carried out with any sort of hardware, software and/or firmware logic that is stored and/or executed on any platform. Some or all of process 400 may be carried out, for example, by logic executing within application system 102 in FIG. 1. For example, various functions shown in FIG. 4 may be implemented using software or firmware logic that is stored in memory 134, 144, and/or 154 and executed by processor 132, 142, and/or 152 as part of an application platform. The particular hardware, software and/or firmware logic that implements any of the various functions shown in FIG. 4, however, may vary from context to context, implementation to implementation, and embodiment to embodiment in accordance with the various features, structures and environments set forth herein. The particular means used to implement each of the various functions shown in FIG. 4, then, could be any sort of processing structures that are capable of executing hardware, software and/or firmware logic in any format. In addition, in certain embodiments, certain steps of the process 400 may vary, and/or may be performed simultaneously or in a different order, than depicted in FIG. 4 and/or described above in connection therewith.

Figure 5:
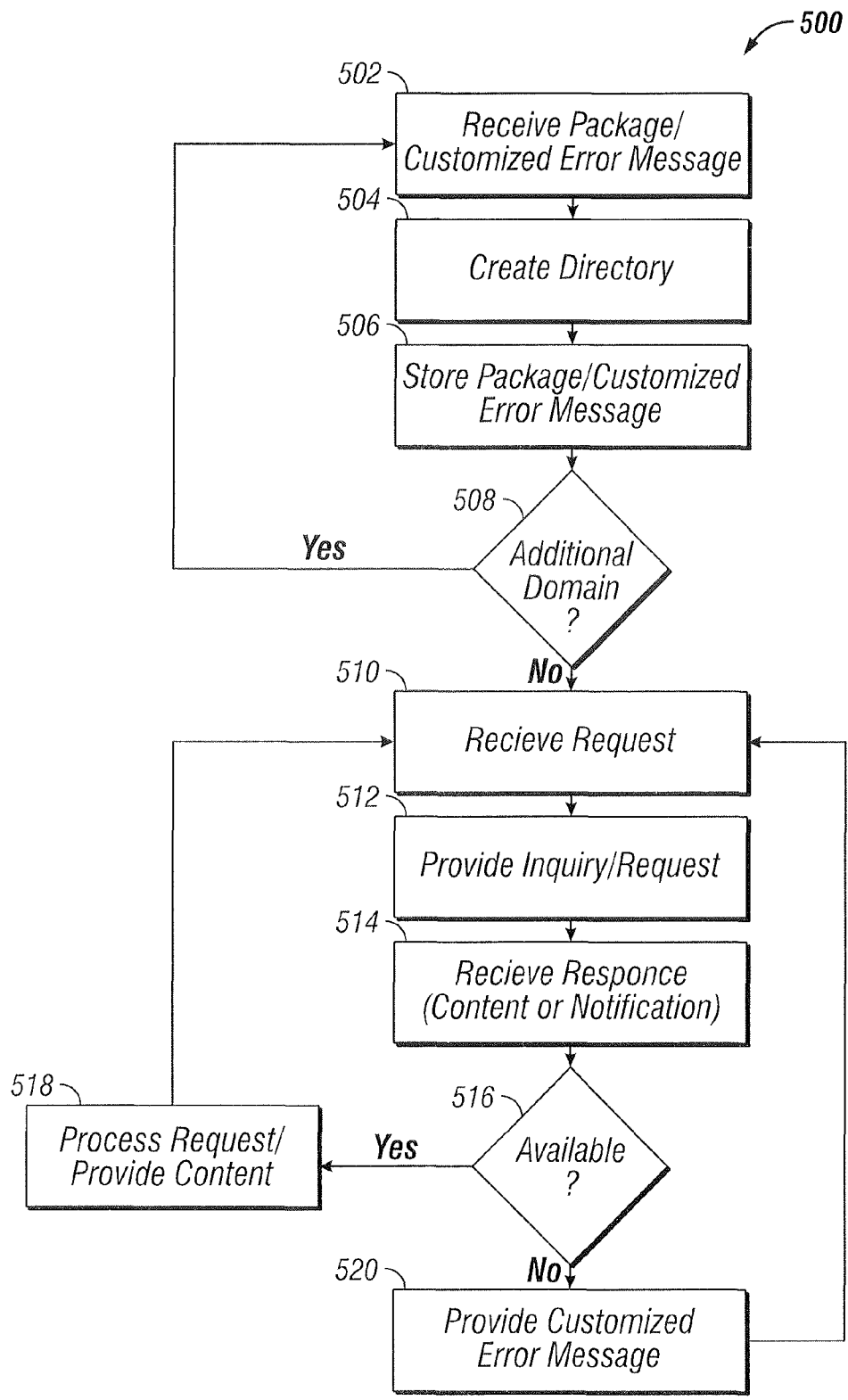
FIG. 5 is a flowchart of another exemplary process for providing customized domain error messages, and that can be implemented using the multi-tenant domain management system of FIG. 1.

FIG. 5 is a flowchart of another exemplary process for providing customized domain error messages. The process 500 can be implemented in connection with the multi-tenant domain management system 100 of FIG. 1.

As depicted in FIG. 5, the process 500 includes the step of receiving a package or file that includes a customized error message and/or information pertaining to the contents of the customized error message for a particular domain (step 502). The customized error message pertains to a domain of one of the clients 106 of FIG. 1. The customized error message (and/or the information pertaining to the contents thereof) is received by one of the servers 146 of the content delivery network 104 of FIG. 1 from the application system 102 of FIG. 1 along the network 107 of FIG. 1. In addition, a directory is created for the package or file (step 504). Preferably, a directory is created for the domain at each of the content delivery network servers 146 of FIG. 1. The package is then stored at each of the directories for the domain (step 506).

Steps 502-506 are then repeated for any additional domains to be processed, as determined in step 508. Accordingly, the customized error message is preferably received in directories at multiple servers 146 of the content delivery network 104 for each domain in advance of any user requests for content, so that the content delivery network 104 can promptly provide the customized error message for any particular domain after receiving a request for content for the domain from a user 108 of FIG. 1 if the content for the domain is unavailable.

Subsequently, subsequent to steps 502-508, a request is received (step 510). The request pertains to a desire of a user 108 of FIG. 1 to access content pertaining to a domain (for example, an Internet website) of a client 106 of FIG. 1. The request is transmitted by the user device 114 of FIG. 1 corresponding to the user 108 along the network 107, and is received by one of the servers 146 of the content delivery network 104 of FIG. 1.

An inquiry or further request is then made pertaining to the content for the domain (step 512). Specifically, the server 146 of the content delivery network 104 that received the user request provides this inquiry or further request to the application system 102 of FIG. 1. This server 146 of the content delivery network 104 then receives a response from the application system (or, in some embodiments, waits to determine whether a response is received) (step 514).

A determination is then made as to whether the content for the domain is available (step 516). In one embodiment, the determination is made by the server 146 of the content delivery network 104 based on the response received from the application system 102 in step 514.

Specifically, if the content for the domain is received from the server 120 of the application system 102 in step 514, then the content is deemed to be available in step 516. The server 146 of the content delivery network 104 then processes the user 108 request (step 518). Specifically, the server 146 provides the domain content for the user 108 by transmitting the domain content to the respective user device 114 of FIG. 1 pertaining to the user 108 that made the request. The process then returns to step 510 as additional requests are received from the same user 108 and/or from different users 108.

Conversely, if a notification is received from the monitoring server 124 of the application system 102 that the server 120 of the application system 102 is unavailable in step 514, then the content is deemed to be unavailable in step 516. Alternatively, in certain embodiments, the content delivery network server 146 may determine that the application system server 120 is unavailable if the content delivery network server 146 does not receive a response from the application system server 120 for the requested content within a predetermined amount of time (for example, a few seconds). In either case, if the application system server 120 is unavailable, the server 146 of the content delivery network 104 then retrieves the customized error message for the domain from the applicable file or package stored in memory for that specific domain, and transmits the customized error message to the respective user device 114 of FIG. 1 pertaining to the user 108 that made the request (step 520). The process then returns to step 510 as additional requests are received from the same user 108 and/or from different users 108.

Generally speaking, the various functions and features of process 500 may be carried out with any sort of hardware, software and/or firmware logic that is stored and/or executed on any platform. Some or all of process 500 may be carried out, for example, by logic executing within application system 102 in FIG. 1. For example, various functions shown in FIG. 5 may be implemented using software or firmware logic that is stored in memory 134, 144, 154 and executed by processor 132, 142, 152 as part of an application platform. The particular hardware, software and/or firmware logic that implements any of the various functions shown in FIG. 5, however, may vary from context to context, implementation to implementation, and embodiment to embodiment in accordance with the various features, structures and environments set forth herein. The particular means used to implement each of the various functions shown in FIG. 5, then, could be any sort of processing structures that are capable of executing hardware, software and/or firmware logic in any format. In addition, in certain embodiments, certain steps of the process 500 may vary, and/or may be performed simultaneously or in a different order, than depicted in FIG. 5 and/or described above in connection therewith.

The term "multi-tenancy" is used herein to generally refer to a system wherein a single hardware and software platform simultaneously supports multiple user groups from a common data store. The shared platform in the multi-tenant architecture is typically designed to virtually partition its data and operations so that each tenant works with a customized virtual application instance. The Force.com service available from SalesForce.com of San Francisco, Calif., for example, provides an application-centric approach that abstracts the server hardware altogether and allows multiple tenants to simultaneously yet securely implement a wide variety of applications.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

What is claimed is:

1. A method comprising the steps of:
receiving a customized message for one of a plurality of domains at one of a plurality of servers of a content delivery network, the content delivery network configured to provide content for the plurality of domains as well as the customized message for the one of the plurality of domains;
storing the customized message on the content delivery network;
receiving a request from a user device for content for the one of the plurality of domains at the one of the plurality of servers;
providing, via the one of the plurality of servers of the content delivery network, the customized message to the user device in response to the request when the one of the plurality of domains is unavailable;
providing an inquiry to a database service via the one of the plurality of servers in response to the request, wherein the database service includes an application server; and
receiving a notification from the database service at the one of the plurality of servers when the content for the one of the plurality of domains is unavailable based on a response from the application server, wherein the customized message is provided by the one of the plurality of servers to the user device after the notification is received.

2. The method of claim 1, wherein the customized message comprises an error message for the one of the plurality of domains for display when the content for the one of the plurality of domains is unavailable.

3. The method of claim 1, wherein:
the database service comprises a multi-tenant on-demand database service; and
the one of the plurality of domains corresponds to a tenant of the multi-tenant on-demand database service.

4. The method of claim 1, further comprising the steps of:
receiving a second customized message for a second one of the plurality of domains at the one of the plurality of servers, the second one of the plurality of domains being different from the first one of the plurality of domains, and the second customized message being different from the first customized message;
receiving a second request from the user device for second content for the second one of the plurality of domains at the one of the plurality of servers; and
providing, via the one of the plurality of servers, the second customized message to the user device in response to the second request when the second content for the second one of the plurality of domains is unavailable.

5. The method of claim 4, further comprising the steps of:
storing the customized message on the one of the plurality of servers of the content delivery network; and
storing the second customized message on the one of the plurality of servers of the content delivery network.

6. A method executable by an application server, the method comprising the steps of:
receiving, at the application server, a customized message for a particular domain, wherein the customized message comprises formatted information for display on a browser application;

providing, from the application server, the customized message to a content delivery network for storage on a plurality of content delivery network servers on the content delivery network for delivery in response to requests received at one of the plurality of content delivery network servers from the browser application when a user of the browser application seeks to access the particular domain and the particular domain is unavailable, wherein the content delivery network is configured to provide content for the plurality of domains as well as to store and provide the customized message for the one of the plurality of domains;

receiving a request for content for the particular domain from one of the plurality of content delivery network servers;

providing, via the application server, the content for the particular domain to the one of the plurality of content delivery network servers in response to the request when the content for the particular domain is available;

determining, via a monitoring server, whether the application server is available; and providing, via the monitoring server, a notification to the one of the plurality of content delivery network servers when the application service is unavailable.

7. The method of claim 6, wherein the particular domain corresponds to a tenant of a multi-tenant on-demand database service.

8. The method of claim 6, wherein the customized message comprises an error message for the particular domain for display when content for the particular domain is unavailable based on a response from the application server.

9. The method of claim 6, further comprising the steps of:
receiving, at the application server, a second customized message for a second particular domain, the second particular domain being different from the particular domain, and the second customized message being different from the customized message; and providing, from the application server, the second customized message to the content delivery network for storage on the plurality of content delivery network servers for delivery in response to requests received from the browser application when the user seeks to access the second particular domain.

10. The method of claim 6, wherein the notification is provided to the one of the plurality of content delivery network servers, to thereby instruct the content delivery network to provide the customized message, in response to the request when the content for the particular domain is unavailable.

11. A content delivery network comprising:
a plurality of servers, each of the plurality of servers of the content delivery network; configured to:
provide content for a plurality of domains;
receive a customized message for one of the plurality of domains;
receive a request from a user device for content for the one of the plurality of domains;
provide an inquiry to a database service via the one of the plurality of servers in response to the request, wherein the database service includes an application server;
receive a notification from the database service at the one of the plurality of servers when the application server is unavailable based on a response from the application server; and
provide the customized message to the user device in response to the request after the notification is received, provided that the one of the plurality of domains is unavailable; and
a memory coupled to the plurality of servers and configured to store the customized message on the content delivery network.

12. The content delivery network of claim 11, wherein the customized message comprises an error message for the one of the plurality of domains for display when the content for the one of the plurality of domains is unavailable.

13. The content delivery network of claim 11, wherein:
the database service comprises a multi-tenant on-demand database service; and
the one of the plurality of domains corresponds to a tenant of the multi-tenant on-demand database service.

14. The content delivery network of claim 11, wherein the one of the plurality of servers is further configured to:
receive a second customized message for a second one of the plurality of domains at the one of the plurality of servers, the second one of the plurality of domains being different from the first one of the plurality of domains, and the second customized message being different from the first customized message;
receive a second request from the user device for second content for the second one of the plurality of domains at the one of the plurality of servers; and
provide the second customized message to the user device in response to the second request when the second content for the second one of the plurality of domains is unavailable.

* * * * *

UNITED STATES PATENT AND TRADEMARK OFFICE
CERTIFICATE OF CORRECTION

PATENT NO. : 8,539,068 B2
APPLICATION NO. : 12/974280
DATED : September 17, 2013
INVENTOR(S) : Jayesh Sureshchandra et al.

It is certified that error appears in the above-identified patent and that said Letters Patent is hereby corrected as shown below:

On the Title Page

Item (12) should read Sureshchandra, et al.

In the Bibliographic data, item (75), Inventors, "Jayesh Sureshehandra" should be changed to --Jayesh Sureshchandra--.

Signed and Sealed this
Twenty-first Day of July, 2015

Michelle K. Lee
*Director of the United States Patent and Trademark Office*